(12) United States Patent
Rothschilds et al.

(10) Patent No.: US 10,318,401 B2
(45) Date of Patent: Jun. 11, 2019

(54) TRIGGERING THE INCREASED COLLECTION AND DISTRIBUTION OF MONITORING INFORMATION IN A DISTRIBUTED PROCESSING SYSTEM

(71) Applicant: Qumulo, Inc., Seattle, WA (US)

(72) Inventors: Thomas Rothschilds, Seattle, WA (US); Remi Bernotavicius, Seattle, WA (US); Edward Brow, Boulder, CO (US); William Ehlhardt, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 15/957,809

(22) Filed: Apr. 19, 2018

(65) Prior Publication Data

US 2018/0307579 A1 Oct. 25, 2018

Related U.S. Application Data

(60) Provisional application No. 62/488,028, filed on Apr. 20, 2017.

(51) Int. Cl.
*G06F 11/34* (2006.01)
*G06F 11/30* (2006.01)

(52) U.S. Cl.
CPC ...... *G06F 11/3495* (2013.01); *G06F 11/3006* (2013.01); *G06F 11/3065* (2013.01); *G06F 11/3419* (2013.01)

(58) Field of Classification Search
USPC ........................................................ 702/186
See application file for complete search history.

(56) References Cited

U.S. PATENT DOCUMENTS 5,165,031 A 11/1992 Pruul et al.
5,319,773 A 6/1994 Britton et al.
(Continued)

FOREIGN PATENT DOCUMENTS

WO 0072201 A1 11/2000

OTHER PUBLICATIONS

Office Communication for U.S. Appl. No. 14/859,114 dated Jul. 24, 2017, pp. 1-49.
(Continued)

*Primary Examiner* — Paul D Lee
(74) *Attorney, Agent, or Firm* — John W. Branch; Lowe Graham Jones PLLC

(57) ABSTRACT

A facility comprising systems and method for automatically triggering the collection of comprehensive monitoring information in a distributed processing system. The facility compares the overall performance of distributed processing system to one or more performance metrics and, in response to determining that one or more performance metrics is not satisfied, triggers one or more of the nodes within the distributed processing system to increase one or more of its monitoring rate or its distribution rate. The facility collects and analyzes the collected information to provide resources that can be used to assess and diagnose failures within the distributed processing system. In this manner, the facility reacts to performance anomalies by triggering nodes within in the system to provide comprehensive performance information over a trigger period for diagnostic purposes.

26 Claims, 6 Drawing Sheets

(56) References Cited

U.S. PATENT DOCUMENTS

| | | |
|---|---|---|
| 5,410,684 A | 4/1995 | Ainsworth et al. |
| 5,410,719 A | 4/1995 | Shackleford |
| 5,953,719 A | 9/1999 | Kleewein et al. |
| 6,496,944 B1 | 12/2002 | Hsiao et al. |
| 6,965,903 B1 | 11/2005 | Agarwal et al. |
| 8,296,312 B1 | 10/2012 | Leung et al. |
| 8,504,733 B1 | 8/2013 | Iyer et al. |
| 9,143,379 B1* | 9/2015 | Berger .................... H04L 29/00 |
| 2002/0083073 A1 | 6/2002 | Vaidya et al. |
| 2003/0145009 A1 | 7/2003 | Forman et al. |
| 2005/0027748 A1 | 2/2005 | Kisley |
| 2005/0119996 A1* | 6/2005 | Ohata ................. G06F 11/3495 |
| 2007/0027985 A1* | 2/2007 | Ramany ............. H04L 67/1097 |
| | | 709/224 |
| 2007/0100855 A1 | 5/2007 | Kohl |
| 2008/0059399 A1 | 3/2008 | DeLorme et al. |
| 2008/0250357 A1 | 10/2008 | Lee et al. |
| 2008/0270469 A1 | 10/2008 | Myerson et al. |
| 2008/0282244 A1* | 11/2008 | Wu ......................... G06F 9/524 |
| | | 718/100 |
| 2008/0313217 A1 | 12/2008 | Dunsmore et al. |
| 2009/0274047 A1* | 11/2009 | Kruys .................... H04L 47/11 |
| | | 370/236 |
| 2009/0319566 A1 | 12/2009 | Wald et al. |
| 2010/0217948 A1 | 8/2010 | Mason et al. |
| 2011/0066668 A1 | 3/2011 | Guarraci |
| 2011/0125973 A1 | 5/2011 | Lev et al. |
| 2011/0246724 A1 | 10/2011 | Marathe et al. |
| 2012/0036463 A1 | 2/2012 | Krakovsky et al. |
| 2014/0040693 A1* | 2/2014 | Kim ........................ H04W 4/06 |
| | | 714/746 |
| 2014/0281411 A1 | 9/2014 | Abdallah |
| 2015/0067086 A1 | 3/2015 | Adriaens et al. |
| 2015/0067142 A1 | 3/2015 | Renkema |
| 2015/0278282 A1 | 10/2015 | Sardina et al. |
| 2016/0371297 A1 | 12/2016 | Okun et al. |
| 2016/0380878 A1* | 12/2016 | Bugenhagen ........... H04L 12/14 |
| | | 370/238 |

OTHER PUBLICATIONS

Office Communication for U.S. Appl. No. 14/595,598 dated Dec. 15, 2017, pp. 1-18.
Office Communication for U.S. Appl. No. 14/658,015 dated Jan. 4, 2018, pp. 1-28.
Office Communication for U.S. Appl. No. 14/859,114 dated Feb. 21, 2018, pp. 1-25.
Office Communication for U.S. Appl. No. 14/595,043 dated May 4, 2017, pp. 1-30.
Office Communication for U.S. Appl. No. 14/595,043 dated May 25, 2018, pp. 1-5.
Office Communication for U.S. Appl. No. 14/595,043 dated Feb. 23, 2018, pp. 1-16.
Office Communication for U.S. Appl. No. 14/595,598 dated Feb. 24, 2017, pp. 1-8.
Office Communication for U.S. Appl. No. 14/658,015 dated Apr. 27, 2017, pp. 1-7.
Office Communication for U.S. Appl. No. 14/859,114 dated May 11, 2018, pp. 1-5.
Office Communication for U.S. Appl. No. 14/595,598 dated Apr. 19, 2018, pp. 1-3.
Office Communication for U.S. Appl. No. 14/859,114 dated Jun. 27, 2018, pp. 1-39.
Office Communication for U.S. Appl. No. 14/595,043 dated Oct. 5, 2018, pp. 1-17.
Office Communication for U.S. Appl. No. 14/658,015 dated Jul. 13, 2018, pp. 1-14.
Office Communication for U.S. Appl. No. 14/595,598 dated Sep. 20, 2018, pp. 1-18.

* cited by examiner

TRIGGERING THE INCREASED COLLECTION AND DISTRIBUTION OF MONITORING INFORMATION IN A DISTRIBUTED PROCESSING SYSTEM

CROSS-REFERENCE TO RELATED APPLICATIONS

This application is a Utility Patent application based on previously filed U.S. Provisional Patent Application U.S. Ser. No. 62/488,028 filed on Apr. 20, 2017, the benefit of the filing date of which is hereby claimed under 35 U.S.C. § 119(e) and which is further incorporated in entirety by reference. This application is related to U.S. Provisional Application No. 62/181,111 entitled "FILESYSTEM HIERARCHICAL CAPACITY QUANTITY AND AGGREGATE METRICS," filed on Jun. 17, 2015; U.S. Provisional Application No. 61/982,926 entitled DATA STORAGE SYSTEM," filed on Apr. 23, 2014; U.S. Provisional Application No. 61/982,931 entitled "DATA STORAGE SYSTEM," filed on Apr. 23, 2014; U.S. Non-Provisional application Ser. No. 14/595,043 entitled "FILESYSTEM HIERARCHICAL AGGREGATE METRICS," filed on Jan. 12, 2015; U.S. Non-Provisional application Ser. No. 14/595,598 entitled "FAIR SAMPLING IN A HIERARCHICAL FILESYSTEM," filed on Jan. 13, 2015; U.S. Non-Provisional application Ser. No. 14/658,015 entitled "DATA MOBILITY, ACCESSIBILITY, AND CONSISTENCY IN A DATA STORAGE SYSTEM," filed on Mar. 13, 2015; and U.S. Non-Provisional application Ser. No. 14/859,114, entitled FILESYSTEM HIERARCHICAL CAPACITY QUANTITY AND AGGREGATE METRICS, filed on Sep. 18, 2015, each of the above-mentioned applications is herein incorporated by reference in its entirety. In cases where the present application and a document incorporated herein by reference conflict, the present application controls.

TECHNICAL FIELD

The present invention relates generally to file systems, and more particularly, but not exclusively, to managing file permission and access control in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. In many cases, distributed file systems may be accessed from client systems that may have different or mismatched permission or access control semantics. Reasonable users may expect file system object permissions or access control semantics that are (or appear to be) consistent with the permissions or access control semantics native to client system they are working with. In some cases, the mismatch of permission or access control semantics across client systems may cause undesirable results that confuse or frustrate users of distributed file system. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
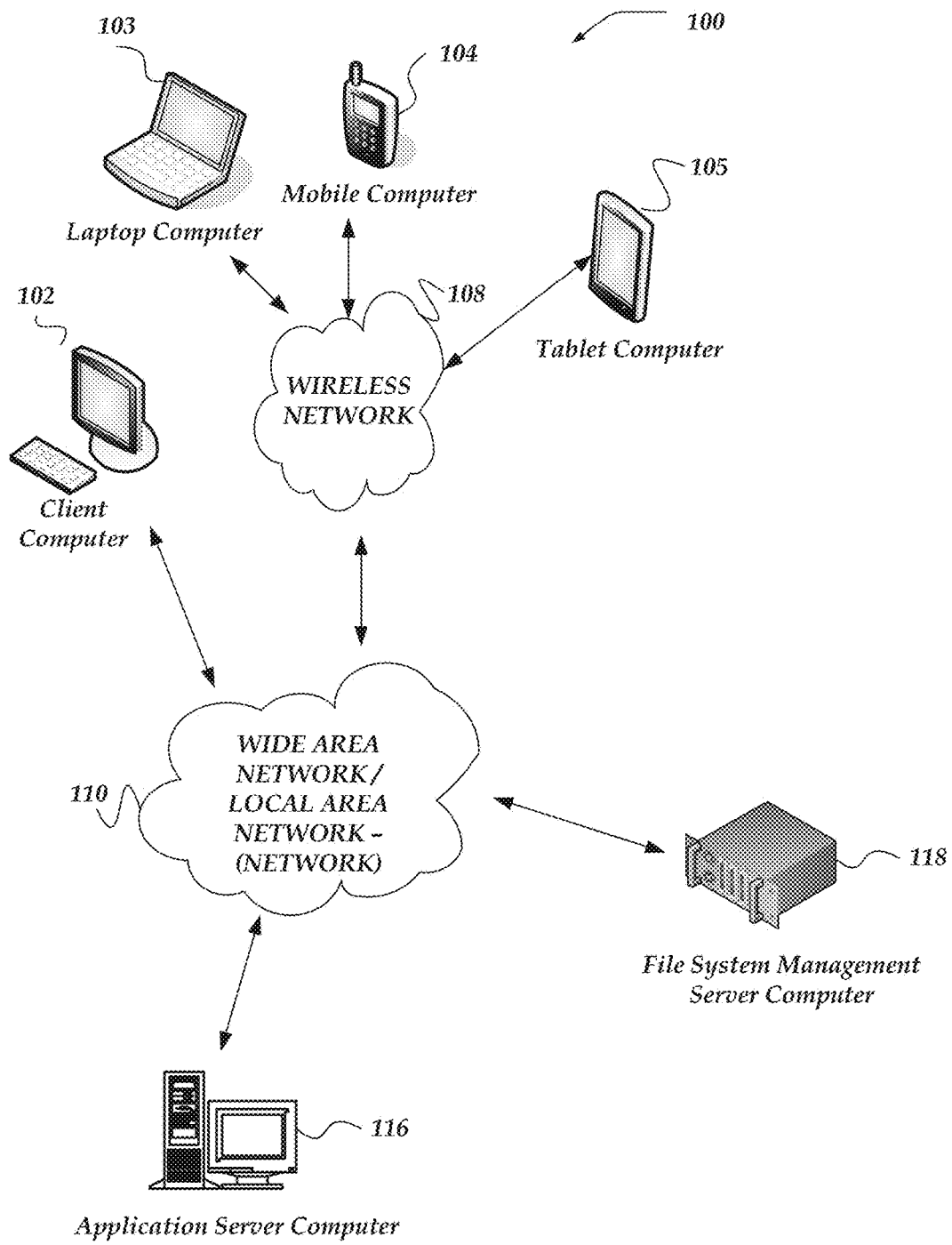
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a monitoring engine may be instantiated to perform actions for managing data in a file system, as described below.

In one or more of the various embodiments, the monitoring engine may be arranged to monitor one or more metrics to collect data that may be associated with one or more nodes that may be part of the file system. In some embodiments, the data for the one or more nodes may include one or more of a lock graph, a task stack, a backtrace, or the like.

In one or more of the various embodiments, the one or more metrics may include one or more of data throughput, latency, processor utilization, disk utilization, a count of dropped network packets, a count of disk inputs over a period of time, a count of disk outputs over a period of time, or the like.

In one or more of the various embodiments, the monitoring of one or more metrics to collect data may include assigning a separate original monitor rate or a separate modified monitor rate to one or more of the metrics based on the one or more metrics and the one or more nodes.

In one or more of the various embodiments, the monitoring engine may be arranged to distribute the data associated with the one or more metrics and the one or more nodes to a file system engine.

In one or more of the various embodiments, the monitoring engine may be arranged to identify one or more tasks that are associated with a locked resource. In one or more of the various embodiments, the monitoring engine may be arranged to identify the one or more tasks that are waiting for the locked resource. In one or more of the various embodiments, the monitoring engine may be arranged to associate the one or more tasks with one or more time values that correspond to one or more attempts to access the locked resource. And, in one or more of the various embodiments, the monitoring engine may be arranged to generate a lock graph based on the one or more tasks such that the lock graph includes a directed graph based on the association with the one or more time values.

In one or more of the various embodiments, the monitoring engine may be arranged to determine the one or more nodes that may be associated with the one or more metrics that exceed one or more trigger levels based on the monitoring.

In one or more of the various embodiments, the monitoring engine may be arranged to modify an original monitor rate associated with the one or more determined nodes such that the modified monitor rate may be associated with a trigger time period.

In one or more of the various embodiments, the monitoring engine may be arranged to truncate the data associated with the one or more nodes to include data that may correspond to an overlapping time period and to omit data that corresponds to one or more non-overlapping time periods.

In one or more of the various embodiments, the monitoring engine may be arranged to select a duration of the trigger time period based on a longest time period that is associated with the one or more metrics that exceed the one or more trigger levels.

In one or more of the various embodiments, the monitoring engine may be arranged to modify an original distribution rate associated with the one or more determined nodes to another distribution rate such that the other distribution rate is associated with another trigger time period.

In one or more of the various embodiments, in response to an expiration of the trigger time period, the monitoring engine may be arranged to restore the modified monitor rate to the original monitor rate. And, in response to an expiration of the other trigger time period, restoring the original distribution rate.

In one or more of the various embodiments, the monitoring engine may be arranged to employ the file system engine to provide one or more reports that may include the data associated with the one or more metrics.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 or file system management server computer 120 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client computer

Figure 2:
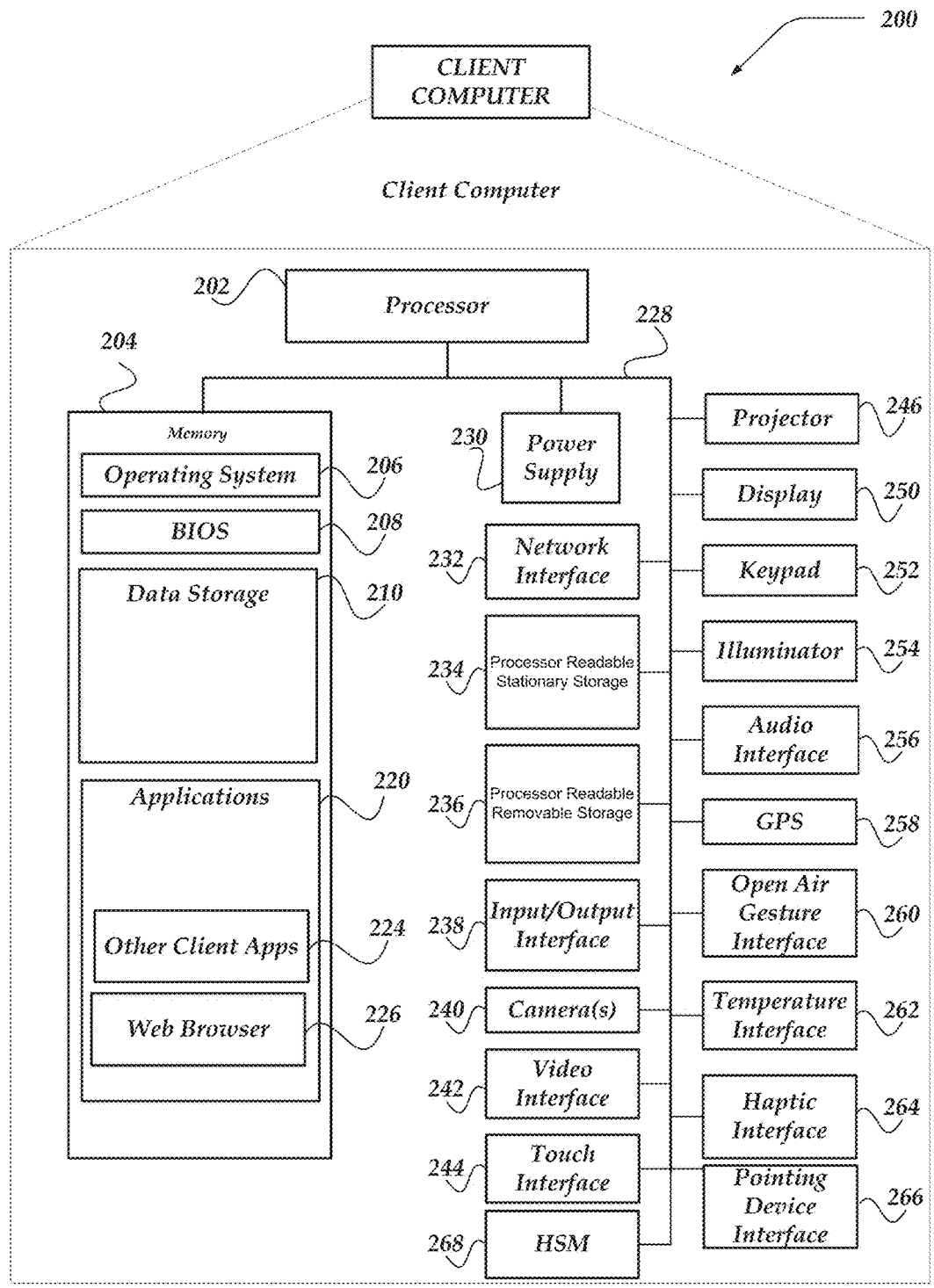
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
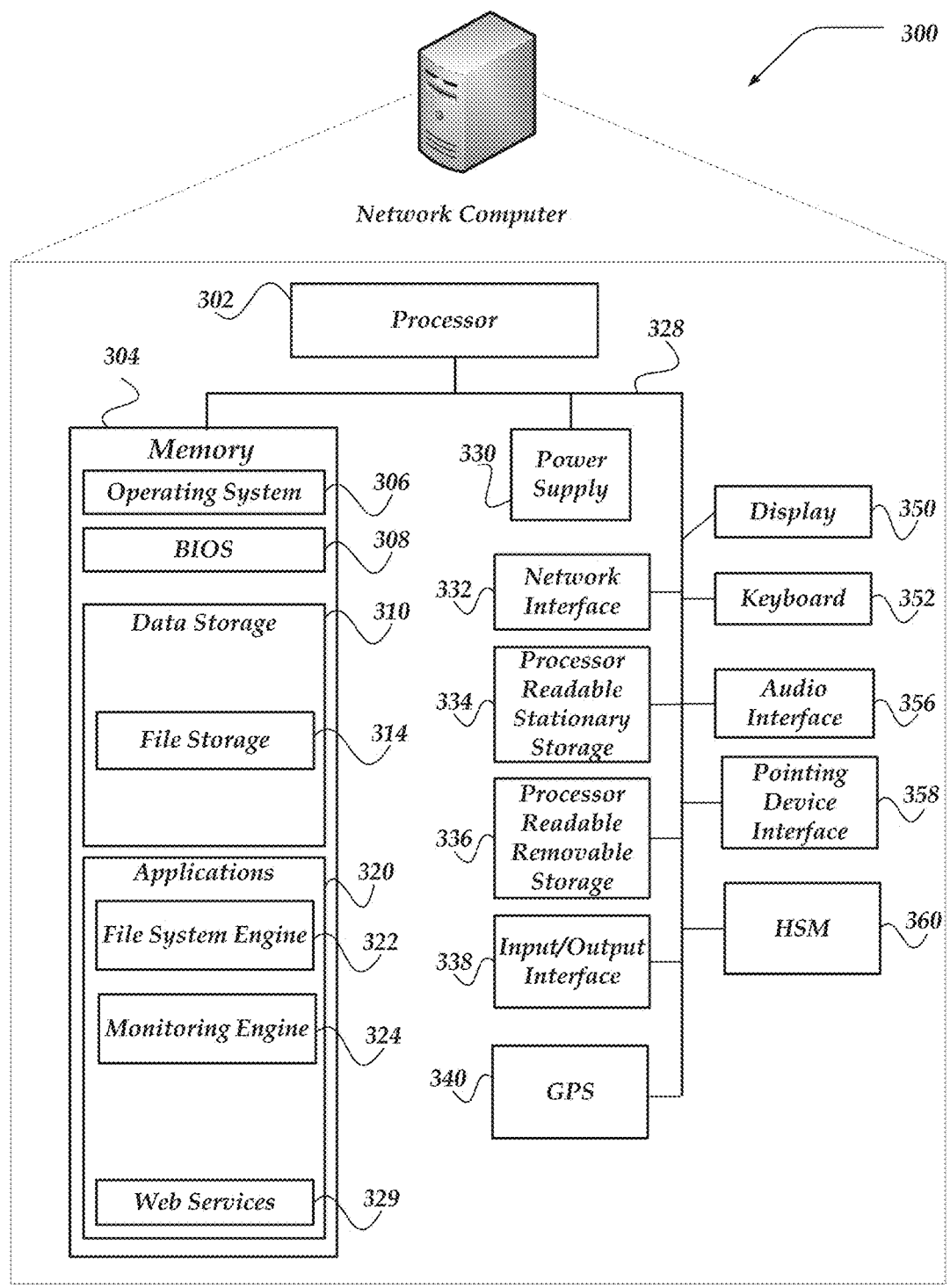
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, monitoring engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, or the like. File storage 314 may store files, documents, versions, properties, permissions information, file meta-data, data structures, or the like, that represent one or more portions of a distributed file system.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, monitoring engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, monitoring engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, monitoring engine 324, web services 329, or the like, may be provisioned and de-commissioned automatically.

Also, in one or more of the various embodiments, file system engine 322, monitoring engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
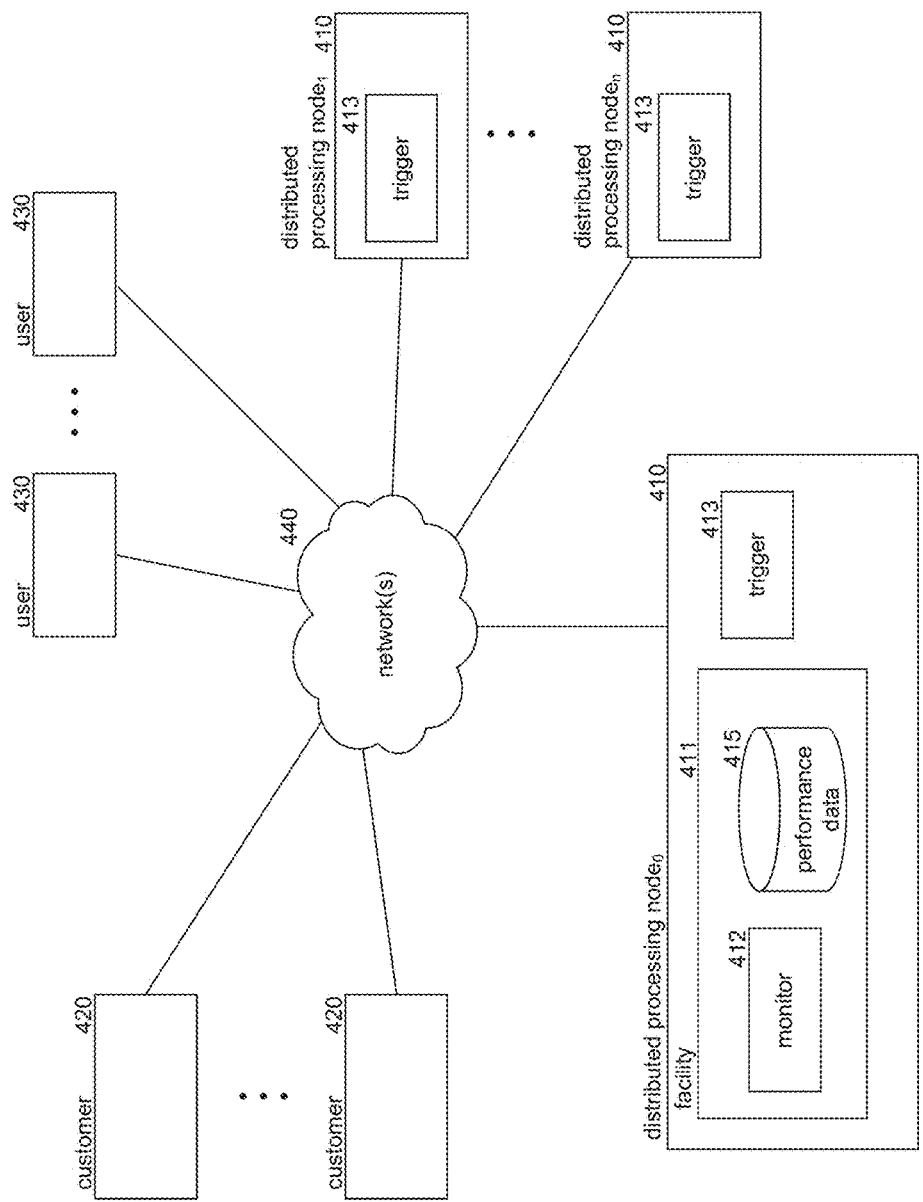
FIG. 4 is a block diagram illustrating an environment in which the facility may operate.

FIG. 4 illustrates a logical architecture of system 400 for triggering the increased collection and distribution of monitoring information in a distributed processing system in accordance with one or more of the various embodiments. The environment 400 includes distributed processing nodes 410, customer computing devices 420, user computing devices 430, and network(s) 440. Distributed processing nodes 410 represent the computing devices within the distributed processing system and may be co-located or remotely-located from any one or more of the other distributed processing nodes. Each of the distributed processing nodes 410 includes trigger component 413, which is invoked by the facility to cause the distributed processing node to enter a trigger period during which the distributed processing node collects and/or distributes performance data to the facility at increased rates. In this embodiment, distributed processing node0 includes facility 411. In other embodiments, the facility may operate at one or more computing devices, including any one or more of the distributed processing nodes, or a computing device other than the distributed processing nodes. Facility 411 includes monitor component 412 and performance data store 415. The monitor component 412 monitors performance information collected from the distributed processing nodes and, in the event that a trigger event occurs (i.e., one or more performance metrics is determined to be unsatisfied), triggers the appropriate distributed processing nodes and generates reporting data generated in response to the comprehensive data collected during the trigger period. Performance data store 415 stores the performance information collected for the distributed processing system from distributed processing nodes and any additional graphs or reports generated by the facility. Customers 430 represent the distributed processing accountholders and may include individuals, organizations, system administrators, and so on that may have tasks executing (or available to be executed) within the distributed processing system. Users 440 represent the users that interact with tasks executing in the distributed processing system, either directly or via network(s) 440.

The computing devices on which the facility is implemented may include one or more network computers, such as, network computer 300 or one or more client computers, such as, client computer 200.

A facility comprising systems and method for automatically triggering the collection of comprehensive or enhanced monitoring information in a distributed processing system is disclosed. In some embodiments, the disclosed facility enables the distributed processing system to quickly identify and assess performance problems or issues within the system without requiring that the distributed processing nodes consistently provide complete performance data. Each computer within the cluster of distributed processing nodes (the distributed processing system) is configured to collect performance data for the node, such as latency, throughput, CPU utilization, disk utilization, backup, data packet drops, etc., according to a predetermined "collection rate" (e.g., once per second, once per minute, once per hour, and so on) and to provide some or all of the collected performance to the facility according to predetermined "distribution rate." In some embodiments, information regarding these performance measures may be provided by other resources operating on the node, such as an operating system, network monitor, disk monitor, an application programming interface exposed by the system, and so on. Each node may have the same or different collection and distribution rates. Similarly, different nodes within the distributed processing system have the same or different collection rates or the same or different distribution rates. Furthermore, each node may have different collection and distribution rates for different types of performance data. In other words, collection and distribution rates need not be identical for different nodes or for different types of data. The facility monitors and analyzes the collected performance data provided by the nodes to assess the overall performance of the distributed system. For example, the facility may determine the overall throughput of the distributed processing system by calculating the sum of throughput values collected from each of the nodes. As another example, the component may determine an overall latency for the distributed processing system by identifying the node within the distributed processing system having the longest latency based on the provided performance data.

The facility compares the overall performance of distributed processing system to one or more performance metrics and, in response to determining that one or more performance metrics is not satisfied, triggers one or more of the nodes within the distributed processing system to increase one or more of its collection rate and/or its distribution rate for a predetermined "trigger period." For example, the facility may prefer that the latency of the distributed processing system or the number of network packet drops remain at or below a predetermined value (e.g., a "trigger level") and "trigger" one or more nodes if either or both of these metrics does not remain at or below these values. As another example, the facility may trigger one or more nodes within the distributed processing system if throughput does not remain at or above a predetermined value. In some embodiments, the facility may trigger one or more nodes if CPU or disk utilization is, or becomes, unbalanced. For example, each node may monitor its CPU utilization over a collection period (e.g., the percentage of time that the CPU is being used during that period). Thus, the facility can analyze the CPU utilization of the distributed nodes to determine whether CPU utilization of one or more of the nodes is significantly higher or lower than that of other nodes. In some cases, the facility may measure "balance" relative to the highest and lowest utilization rates in the distributed processing system and determine that a "balance" metric is not satisfied if that difference exceeds a predetermined threshold (e.g., 10%, 15%, 30%, etc.). In some cases, the facility may measure "balance" by calculating an average utilization value for the system and a corresponding variance and determine that a "balance" metric is not satisfied if the variance exceeds a predetermined threshold.

The facility may increase the collection and distribution rates using different techniques. For example, the component may trigger each node to quadruple its collection rate and increase its distribution rate by ten-fold for the next ten seconds, minute, five minutes, and so on. As another example, the facility may trigger each node to set its collection and distribution rates to a fixed value, such as ten times per second, once per second, and so on for the next 60 seconds, 30 minutes, 2 hours, etc. In some cases, the increase may be based on the node itself, such as whether the node is exhibiting the performance issue that caused the performance metric (or metrics) to not be satisfied. Furthermore, the collection or distribution rates may only be increased for certain types of performance data. For example, a user may associate different types of performance data with performance metrics and when these performance metrics are not satisfied, the facility will trigger an increase for the associated types of performance data.

In addition to increasing the rates at which nodes within the distributed processing system collect and distribute performance information in response to identifying a performance metric failure, the facility may also trigger the nodes to provide additional information regarding performance during the trigger period, such as a lock graph, performance stack information, stack traces, performance counters, and so on. Each lock graph from a node provides, for example, a) an indication of which processes or tasks executing at the node either 1) have locked a particular resource or 2) are waiting for a particular locked resource, b) the identity of the particular resource(s), and c) the time at which the resource was locked or access to the resource was requested. For example, a lock graph for one node may indicate that one task has locked a particular portion of memory and is blocked waiting to write to a particular port while another task is blocked waiting to waiting to write to the same port. The performance stack information provides, for each task, a backtrace of the subroutines and code locations for the actions performed by the task. The stack traces represent a time measurement around different areas of code configured to be traced. In other words, tasks can be monitored as to when they enter and exit marked portions of code (i.e., the difference in time between when a CPU enters a marked portion of code and when the CPU exits that portion of marked code) and this time can be recorded. Furthermore, the facility may trigger the collection and distribution of performance counters, such as how many times a particular action happens over a predetermined period, disk inputs and disk outputs over a predetermined time, various protocol operations over a predetermined period, and so on.

After the trigger period ends, the facility collects and analyzes the collected information to provide resources that can be used to assess and diagnose failures within the distributed processing system. For example, the facility may construct a system-wide lock graph to identify any deadlocks and/or resource starvation issues within the distributed processing system. A system-wide lock graph may allow the facility to identify which task at which node is blocking access to a resource needed by other tasks. In some cases, the facility may generate a visual graph of the system-wide lock graph using graphing tools for generating directed graphs. As another example, the facility may generate performance summaries from the collected data indicating the rate at which these resources are used, such as a listing of the most common procedure calls during the trigger period (e.g., top 10), a listing of the procedure calls that take the longest to complete during the trigger period (e.g., top 20), the slowest disks during the trigger period (e.g., bottom 30), the most used disks during the trigger period (top 40), the marked portions of code that take the longest to execute during the trigger period relative to their historical averages (e.g., during previously monitored periods) (top 50), the most used and underutilized CPUs, and so on. Furthermore, the facility may generate one or more reports or visualization including the above-mentioned graphs or summaries for use by a system administrator to further assess and diagnose problems within the distributed processing system. In some cases, the facility may email or otherwise inform a user or administrator to inform them that a trigger event has occurred. In this manner, the facility reacts to performance anomalies by triggering nodes within in the system to provide comprehensive performance information over a trigger period for diagnostic purposes.

Generalized Operations

Figure 5:
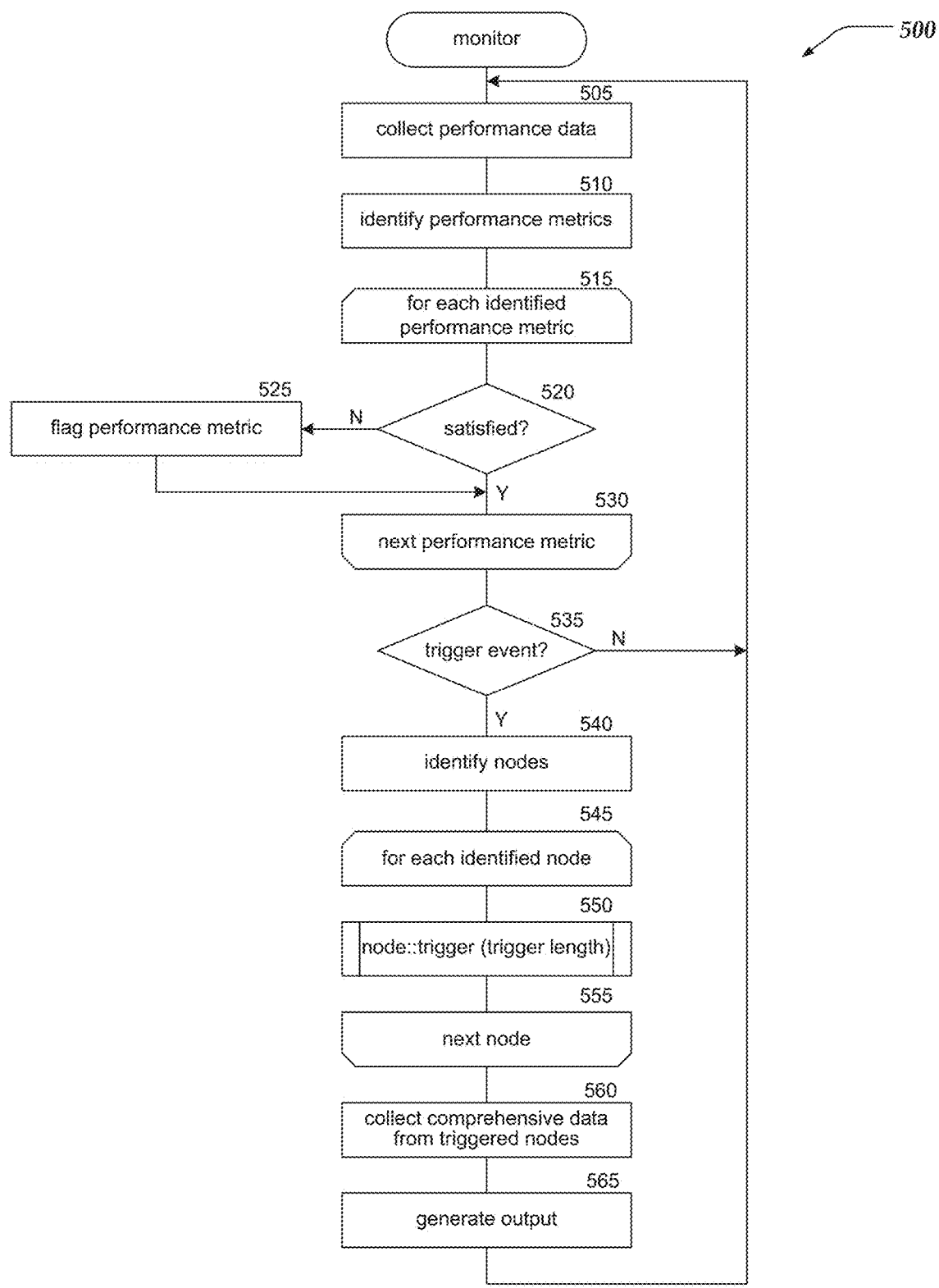
FIG. 5 is a flow diagram illustrating the processing of a monitor component.
Figure 6:
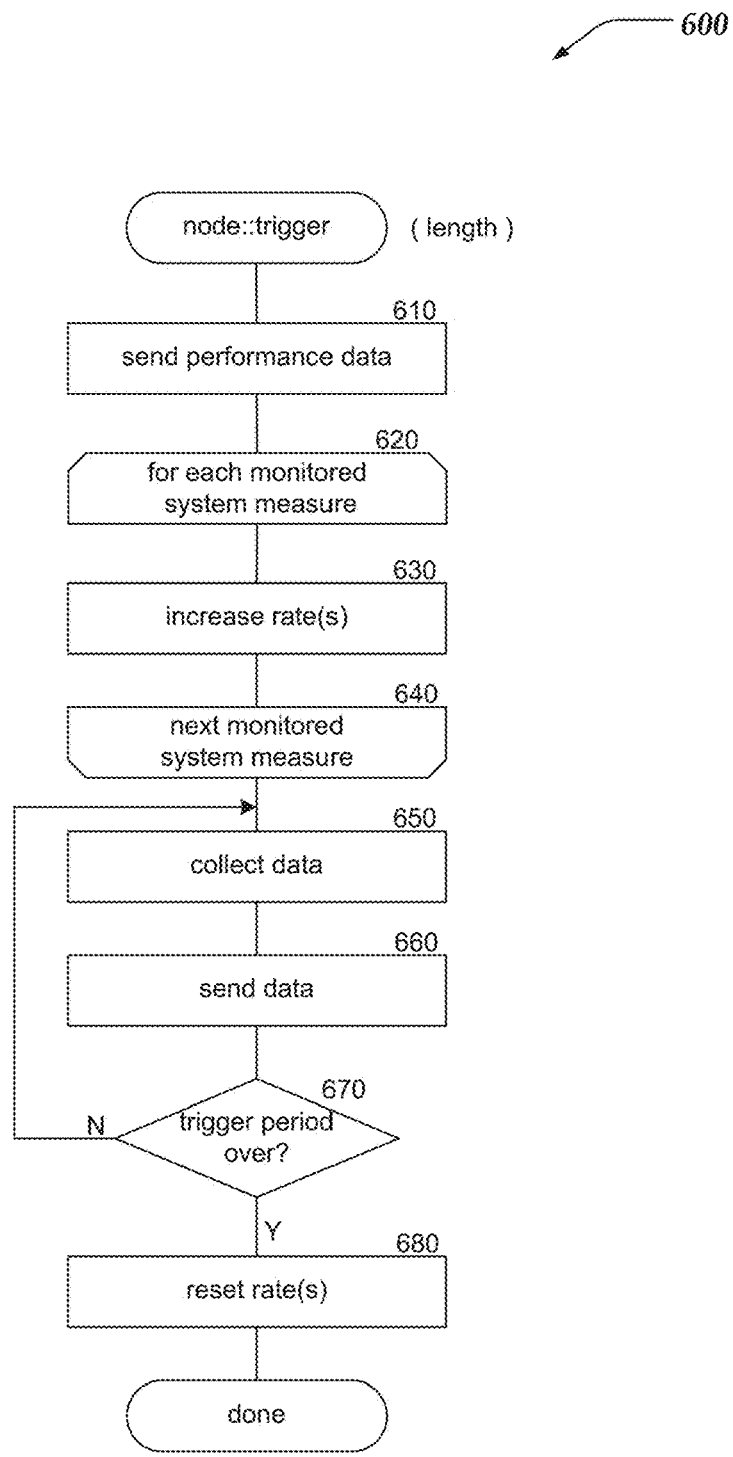
FIG. 6 is a flow diagram illustrating the processing of a trigger component.

FIGS. 5-6 represent generalized operations for triggering the increased collection and distribution of monitoring information in a distributed processing system in accordance with one or more of the various embodiments. In one or more of the various embodiments, processes 500 and 600 described in conjunction with FIGS. 5-6 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 5-6 may be used for triggering the increased collection and distribution of monitoring information in a distributed processing system in accordance with at least one of the various embodiments or architectures such as those described in conjunction with FIG. 4. Further, in one or more of the various embodiments, some or all of the actions performed by processes 500 and 600 may be executed in part by file system engine 322, or monitoring engine 324 running on one or more processors of one or more network computers.

FIG. 5 is a flow diagram illustrating process 500 for monitoring information in a distributed processing system in accordance with some embodiments of the disclosed technology. In this embodiment, each distributed processing node within the distributed processing system periodically provides performance data for the node to the facility for monitoring by a monitoring engine, such as, monitoring engine 324. The monitoring engine collects this data and periodically (e.g., once per second, once per minute, three times per minute, etc.) analyzes and compares this collected data to one or more performance metrics to determine whether a trigger event has occurred and, if so, triggers the appropriate nodes.

At block 505, the monitoring engine collects performance data from the distributed processing nodes. In some embodiments, the monitoring engine collects data for a predetermined "collection period" before moving on to block 510, such as ten seconds, a minute, and hour, and so on.

At block 510, the monitoring engine may be arranged to identify performance metrics to be measured, which may be defined by a system administrator or other user. For example, in some cases the monitoring engine may be configured to only look certain types of performance issues, such as CPU balance and throughput while ignoring other issues, such as disk utilization.

At blocks 515-525, in one or more of the various embodiments, process 500 loops through each of the identified performance metrics to determine whether any of the performance metrics are not satisfied.

At decision block 520, if the currently-selected performance is not satisfied, then the process continues at block 525; otherwise the process continues at block 530. For example, if one of the performance metrics is that the number of TCP packet drops should not fall below a certain rate and the collected performance data indicates that the TCP packet drops exceed that rate during a previous period, then the process would continue at block 525.

At block 525, the monitoring engine may be arranged to flag the metric as not being satisfied and continues at block 530.

At block 530, the monitoring engine may be arranged to select the next performance metric, if any, and then loops back to block 515 to process the newly-selected performance metric.

At decision block 535, if a trigger event has occurred (i.e., if any of the performance metrics were flagged), then the control may flow to block 540; otherwise the control may loop back to block 505 to collect additional performance data from the distributed processing nodes.

At block 540, the monitoring engine may be arranged to identify the distributed processing nodes relevant to the flagged performance metrics (i.e., the performance metrics that were not satisfied during the previous collection period), which may include any one or all of the distributed processing nodes.

At blocks 545-555, process 500 loops through the identified nodes and invokes a trigger component of that node by, for example, sending a request to the node, such as a remote procedure call.

At block 550, the monitoring engine may be arranged to invoke the trigger component of the currently-selected distributed processing node. In some embodiments, the invocation of the trigger component may include an indication of the length of the trigger event, such as one minute, ten minutes, one hour, and so on. In some cases, each performance metric may have an associated "trigger length." In the case that only one performance metric caused a trigger event, the component may use the "trigger length" associated with the performance metric. In the event that multiple performance metrics are not satisfied, then the component may use the longest trigger length associated with the performance metrics that were not satisfied. If a performance metric does not have an associated trigger length, then the monitoring engine may use a default trigger length when invoking a trigger component.

At block 555, the monitoring engine may be arranged to select the next distributed processing node, if any, and then loop back to block 545 to process the newly-selected distributed processing node.

At block 560, the monitoring engine may be arranged to collect comprehensive data from the triggered distributed processing nodes, such as lock graphs, performance stack information, stack traces, performance counters, and so on along with performance data collected at a higher rate. In some cases, the component may remove (or trim) non-overlapping data collected from one or more of the distributed processing nodes. For example, if the trigger length is ten minutes and one distributing processing node begins its trigger period at 00:01:00 and ends at 00:11:00, another distributing processing node begins its trigger period at 00:01:03 and ends at 00:11:03, and another distributing processing node begins its trigger period at 00:01:47 and ends at 00:11:47, then the component may trim the collected data so that it includes information for the period beginning at 00:01:47 and ending at 00:11:00. These discrepancies may be caused by network latency, processing capabilities (and resources available) at each node, remote procedure call propagation delays, and so on.

At block 565, the monitoring engine may be arranged to generate output for the collected data, such as a distributed processing system-wide lock graph, performance stack information summaries or reports for the distributed processing system, stack trace information summaries or reports for the distributed processing system, performance counter information summaries or reports for the distributed processing systems, or the like.

FIG. 6 is a flow diagram illustrating process 600 for triggering increased collection of monitoring information in accordance with one or more of the various embodiments. After a trigger, at block 610, the monitoring engine collects and sends current performance information for the node, such as a lock graph, performance stack information, stack traces, performance counters, or the like.

At blocks 620-640, the monitoring engine loops through each of the monitored performance measures for the node and increases the monitoring rate for the performance measure.

At block 630, the monitoring engine increases the collection or distribution rates for the currently-selected performance measure by, for example, setting the rate to a predefined value (e.g., 20 times per second, 50 times per minute), multiplying the rate by a predefined value (e.g., 2×, 5×, 20×, 100×), or the like.

At block 340, the monitoring engine selects the next monitored system measure, if any, and then loops back to block 620 to process the newly-selected system measure.

At block 650, the monitoring engine collects data for the monitored system measures at the increased rates.

At block 660, the monitoring engine sends the collected data to the facility. In some cases, the collection and sending of different data may occur contemporaneously to collect and distribute at the increased rates for the different performance metrics.

At decision block 670, if the trigger period has finished, then the monitoring engine continues at block 680, else control loops back to block 650 to collect additional data at the increased rate.

At block 680, the monitoring engine resets the collection and distribution rates for the monitored system measures and then completes.

From the foregoing, it will be appreciated that specific embodiments of the invention have been described herein for purposes of illustration, but that various modifications may be made without deviating from the scope of the invention. Accordingly, the invention is not limited except as by the appended claims.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    instantiating a monitoring engine to perform actions including:
        monitoring one or more metrics to collect data that is associated with one or more nodes that are part of the file system, wherein each node is a computer that separately provides computing resources over the network that are characterized by the one or more metrics;
        determining the one or more nodes that are associated with the one or more metrics that exceed one or more trigger levels based on the monitoring;
        modifying an original monitor rate associated with the one or more determined nodes, wherein the modified monitor rate is associated with a trigger time period, wherein a duration of the trigger time period is selected based on a longest time period that is associated with the one or more metrics that exceed the one or more trigger levels;
        in response to an expiration of the trigger time period, restoring the modified monitor rate to the original monitor rate; and
        employing a file system engine to provide one or more reports that include the data associated with the one or more metrics, wherein the one or more reports improve identifying the one or more computers having computing resources characterized by the one or metrics that exceed the one or more trigger levels during the trigger time period.

2. The method of claim 1, wherein the monitoring engine performs actions, further comprising:
    distributing the data associated with the one or more metrics and the one or more nodes to the file system engine;
    modifying an original distribution rate associated with the one or more determined nodes to another distribution rate, wherein the other distribution rate is associated with another trigger time period; and
    in response to an expiration of the other trigger time period, restoring the original distribution rate.

3. The method of claim 1, wherein the data for the one or more nodes includes one or more of a lock graph, a task stack, or a backtrace.

4. The method of claim 1, wherein the monitoring engine performs actions, further comprising:
    identifying one or more tasks that are associated with a locked resource;
    identifying the one or more tasks that are waiting for the locked resource;
    associating the one or more tasks with one or more time values that correspond to one or more attempts to access the locked resource; and
    generating a lock graph based on the one or more tasks, wherein the lock graph includes a directed graph based on the association with the one or more time values.

5. The method of claim 1, wherein the monitoring engine performs actions, further comprising, truncating the data associated with the one or more nodes to include data that corresponds to an overlapping time period and to omit data that corresponds to one or more non-overlapping time periods.

6. The method of claim 1, wherein the monitoring of one or more metrics to collect data further comprises, assigning a separate original monitor rate or a separate modified monitor rate to one or more of the metrics based on the one or more metrics and the one or more nodes.

7. The method of claim 1, wherein the one or more metrics include one or more of data throughput, latency, processor utilization, disk utilization, a count of dropped network packets, a count of disk inputs over a period of time, or a count of disk outputs over a period of time.

8. A system for managing data in a file system comprising:
    a network computer, comprising:
        a transceiver that communicates over the network;
        a memory that stores at least instructions; and
        one or more processors that execute instructions that perform actions, including:
    instantiating a monitoring engine to perform actions including:
        monitoring one or more metrics to collect data that is associated with one or more nodes that are part of the file system, wherein each node is a computer that separately provides computing resources over the network that are characterized by the one or more metrics;
        determining the one or more nodes that are associated with the one or more metrics that exceed one or more trigger levels based on the monitoring;
        modifying an original monitor rate associated with the one or more determined nodes, wherein the modified monitor rate is associated with a trigger time period, wherein a duration of the trigger time period is selected based on a longest time period that is associated with the one or more metrics that exceed the one or more trigger levels;
        in response to an expiration of the trigger time period, restoring the modified monitor rate to the original monitor rate; and
        employing a file system engine to provide one or more reports that include the data associated with the one or more metrics, wherein the one or more reports improve identifying the one or more computers having computing resources characterized by the one or metrics that exceed the one or more trigger levels during the trigger time period; and
    a client computer, comprising:
        a transceiver that communicates over the network;

a memory that stores at least instructions; and
one or more processors that execute instructions that perform actions, including:
receiving, the one or more reports.

9. The system of claim 8, wherein the monitoring engine performs actions, further comprising:
distributing the data associated with the one or more metrics and the one or more nodes to the file system engine;
modifying an original distribution rate associated with the one or more determined nodes to another distribution rate, wherein the other distribution rate is associated with another trigger time period; and
in response to an expiration of the other trigger time period, restoring the original distribution rate.

10. The system of claim 8, wherein the data for the one or more nodes includes one or more of a lock graph, a task stack, or a backtrace.

11. The system of claim 8, wherein the monitoring engine performs actions, further comprising:
identifying one or more tasks that are associated with a locked resource;
identifying the one or more tasks that are waiting for the locked resource;
associating the one or more tasks with one or more time values that correspond to one or more attempts to access the locked resource; and
generating a lock graph based on the one or more tasks, wherein the lock graph includes a directed graph based on the association with the one or more time values.

12. The system of claim 8, wherein the monitoring engine performs actions, further comprising, truncating the data associated with the one or more nodes to include data that corresponds to an overlapping time period and to omit data that corresponds to one or more non-overlapping time periods.

13. The system of claim 8, wherein the monitoring of one or more metrics to collect data further comprises, assigning a separate original monitor rate or a separate modified monitor rate to one or more of the metrics based on the one or more metrics and the one or more nodes.

14. The system of claim 8, wherein the one or more metrics include one or more of data throughput, latency, processor utilization, disk utilization, a count of dropped network packets, a count of disk inputs over a period of time, or a count of disk outputs over a period of time.

15. A processor readable non-transitory storage media that includes instructions for managing data in a file system over a network, wherein execution of the instructions by one or more processors on one or more network computers performs actions, comprising:
instantiating a monitoring engine to perform actions including:
monitoring one or more metrics to collect data that is associated with one or more nodes that are part of the file system, wherein each node is a computer that separately provides computing resources over the network that are characterized by the one or more metrics;
determining the one or more nodes that are associated with the one or more metrics that exceed one or more trigger levels based on the monitoring;
modifying an original monitor rate associated with the one or more determined nodes, wherein the modified monitor rate is associated with a trigger time period, wherein a duration of the trigger time period is selected based on a longest time period that is associated with the one or more metrics that exceed the one or more trigger levels;
in response to an expiration of the trigger time period, restoring the modified monitor rate to the original monitor rate; and
employing a file system engine to provide one or more reports that include the data associated with the one or more metrics, wherein the one or more reports improve identifying the one or more computers having computing resources characterized by the one or metrics that exceed the one or more trigger levels during the trigger time period.

16. The media of claim 15, wherein the monitoring engine performs actions, further comprising:
distributing the data associated with the one or more metrics and the one or more nodes to the file system engine;
modifying an original distribution rate associated with the one or more determined nodes to another distribution rate, wherein the other distribution rate is associated with another trigger time period; and
in response to an expiration of the other trigger time period, restoring the original distribution rate.

17. The media of claim 15, wherein the data for the one or more nodes includes one or more of a lock graph, a task stack, or a backtrace.

18. The media of claim 15, wherein the monitoring engine performs actions, further comprising:
identifying one or more tasks that are associated with a locked resource;
identifying the one or more tasks that are waiting for the locked resource;
associating the one or more tasks with one or more time values that correspond to one or more attempts to access the locked resource; and
generating a lock graph based on the one or more tasks, wherein the lock graph includes a directed graph based on the association with the one or more time values.

19. The media of claim 15, wherein the monitoring engine performs actions, further comprising, truncating the data associated with the one or more nodes to include data that corresponds to an overlapping time period and to omit data that corresponds to one or more non-overlapping time periods.

20. The media of claim 15, wherein the monitoring of one or more metrics to collect data further comprises, assigning a separate original monitor rate or a separate modified monitor rate to one or more of the metrics based on the one or more metrics and the one or more nodes.

21. A network computer for managing data in a file system, comprising:
a transceiver that communicates over the network;
a memory that stores at least instructions; and
one or more processors that execute instructions that perform actions, including:
instantiating a monitoring engine to perform actions including:
monitoring one or more metrics to collect data that is associated with one or more nodes that are part of the file system, wherein each node is a computer that separately provides computing resources over the network that are characterized by the one or more metrics;
determining the one or more nodes that are associated with the one or more metrics that exceed one or more trigger levels based on the monitoring;

modifying an original monitor rate associated with the one or more determined nodes, wherein the modified monitor rate is associated with a trigger time period, wherein a duration of the trigger time period is selected based on a longest time period that is associated with the one or more metrics that exceed the one or more trigger levels;

in response to an expiration of the trigger time period, restoring the modified monitor rate to the original monitor rate; and employing a file system engine to provide one or more reports that include the data associated with the one or more metrics, wherein the one or more reports improve identifying the one or more computers having computing resources characterized by the one or metrics that exceed the one or more trigger levels during the trigger time period.

22. The network computer of claim 21, wherein the monitoring engine performs actions, further comprising:

distributing the data associated with the one or more metrics and the one or more nodes to the file system engine;

modifying an original distribution rate associated with the one or more determined nodes to another distribution rate, wherein the other distribution rate is associated with another trigger time period; and in response to an expiration of the other trigger time period, restoring the original distribution rate.

23. The network computer of claim 21, wherein the data for the one or more nodes includes one or more of a lock graph, a task stack, or a backtrace.

24. The network computer of claim 21, wherein the monitoring engine performs actions, further comprising:

identifying one or more tasks that are associated with a locked resource;

identifying the one or more tasks that are waiting for the locked resource;

associating the one or more tasks with one or more time values that correspond to one or more attempts to access the locked resource; and generating a lock graph based on the one or more tasks, wherein the lock graph includes a directed graph based on the association with the one or more time values.

25. The network computer of claim 21, wherein the monitoring engine performs actions, further comprising, truncating the data associated with the one or more nodes to include data that corresponds to an overlapping time period and to omit data that corresponds to one or more non-overlapping time periods.

26. The network computer of claim 21, wherein the monitoring of one or more metrics to collect data further comprises, assigning a separate original monitor rate or a separate modified monitor rate to one or more of the metrics based on the one or more metrics and the one or more nodes.

* * * * *